(12) United States Patent
Kosovich et al.

(10) Patent No.: US 9,914,144 B2
(45) Date of Patent: Mar. 13, 2018

(54) COLOR CODED NOZZLE ADAPTER AND LOCATOR TOOL

(71) Applicant: Nordson Corporation, Westlake, OH (US)

(72) Inventors: Deborah S. Kosovich, Grafton, OH (US); Vincent A. Prieto, Lorain, OH (US); James V. Bachman, Lorain, OH (US)

(73) Assignee: Nordson Corporation, Westlake, OH (US)

( * ) Notice: Subject to any disclaimer, the term of this patent is extended or adjusted under 35 U.S.C. 154(b) by 114 days.

(21) Appl. No.: 14/390,169

(22) PCT Filed: Apr. 11, 2013

(86) PCT No.: PCT/US2013/036137
§ 371 (c)(1),
(2) Date: Oct. 2, 2014

(87) PCT Pub. No.: WO2013/158458
PCT Pub. Date: Oct. 24, 2013

(65) Prior Publication Data
US 2015/0060577 A1 Mar. 5, 2015

Related U.S. Application Data

(60) Provisional application No. 61/624,428, filed on Apr. 16, 2012.

(51) Int. Cl.
*B05B 15/06* (2006.01)
*B05B 1/02* (2006.01)
(Continued)

(52) U.S. Cl.
CPC .............. *B05B 15/066* (2013.01); *B05B 1/02* (2013.01); *B05B 13/06* (2013.01);
(Continued)

(58) Field of Classification Search
CPC ... B05B 13/0627; B05B 15/065; B05B 13/06; B05B 15/06; B05B 1/02; B05B 15/066; G01B 21/04
(Continued)

(56) References Cited

U.S. PATENT DOCUMENTS 3,543,332 A 12/1970 Wagner et al.
3,590,739 A 7/1971 Persson et al.
(Continued)

FOREIGN PATENT DOCUMENTS

CN 101849872 A 10/2010
DE 20 2011 109027 1/2012
(Continued)

OTHER PUBLICATIONS

International Search Report dated Jan. 15, 2014 International Application No. PCT/US2013/036137.
(Continued)

*Primary Examiner* — Arthur O Hall
*Assistant Examiner* — Steven M Cernoch
(74) *Attorney, Agent, or Firm* — Baker & Hostetler LLP

(57) ABSTRACT

A spray nozzle assembly includes a nozzle tip and a nozzle tip adapter. The nozzle tip adapter may include a visually perceptible indicia that corresponds uniquely to an offset angle value of the nozzle tip adapter. In one embodiment, the visually perceptible indicia may comprise a unique color for each offset angle among a selectable group of nozzle tip adapters. Another feature is a locator tool that includes an adjustable holder that is fixed in position relative to a spray nozzle tip or orifice during an alignment operation, and repositioned away from the nozzle tip during a spraying operation. The adjustable holder may include a measure-
(Continued)

ment member to determine one or more distances between the nozzle tip or orifice and a location on a workpiece that will be coated or sprayed.

27 Claims, 9 Drawing Sheets

(51) Int. Cl.
  *B05B 13/06* (2006.01)
  *G01B 21/04* (2006.01)
(52) U.S. Cl.
  CPC .......... *B05B 13/0627* (2013.01); *B05B 15/06* (2013.01); *B05B 15/065* (2013.01); *G01B 21/04* (2013.01)
(58) Field of Classification Search
  USPC .................. 239/390, 71, 465, 580, 597–602
  See application file for complete search history.

(56) References Cited

U.S. PATENT DOCUMENTS

| | | | |
|---|---|---|---|
| 3,658,257 A * | 4/1972 | Rood | B05B 13/0627 239/589 |
| 3,662,927 A | 5/1972 | Cocks et al. | |
| 3,779,462 A | 12/1973 | Bruninga | |
| 4,039,039 A | 8/1977 | Gottfried | |
| 4,066,188 A | 1/1978 | Scholl et al. | |
| 4,346,848 A | 8/1982 | Malcolm | |
| 4,456,180 A | 6/1984 | Lury | |
| 4,488,665 A | 12/1984 | Cocks et al. | |
| 4,570,858 A | 2/1986 | Bintner et al. | |
| 4,600,124 A | 7/1986 | Price | |
| 4,671,315 A | 6/1987 | Gardner | |
| 4,717,077 A * | 1/1988 | Takata | B05B 15/069 239/548 |
| 4,911,956 A | 3/1990 | Gabryszewski et al. | |
| 5,020,435 A | 6/1991 | Cawte | |
| 5,078,325 A * | 1/1992 | Waryu | B05B 1/3053 239/526 |
| 5,199,604 A | 4/1993 | Palmer et al. | |
| 5,255,682 A | 10/1993 | Pawluskiewicz et al. | |
| 5,265,803 A | 11/1993 | Thayer | |
| 5,277,344 A | 1/1994 | Jenkins | |
| 5,351,715 A | 10/1994 | Byam | |
| 5,356,079 A | 10/1994 | Rahbar | |
| 5,544,813 A | 8/1996 | Giles et al. | |
| 5,709,923 A | 1/1998 | Ciaramitaro | |
| 5,865,419 A | 2/1999 | Nelson et al. | |
| 5,934,520 A | 8/1999 | Byerly et al. | |
| 5,937,887 A | 8/1999 | Baxter et al. | |
| 5,979,866 A | 11/1999 | Baxter et al. | |
| 6,053,198 A | 4/2000 | Atkin et al. | |
| 6,053,212 A | 4/2000 | Thomas | |
| 6,077,375 A | 6/2000 | Kwok | |
| 6,082,627 A | 7/2000 | Raterman | |
| 6,092,390 A | 7/2000 | Griffith, Jr. | |
| 6,120,007 A | 9/2000 | Grant | |
| 6,322,242 B1 | 11/2001 | Lang et al. | |
| 6,325,297 B1 | 12/2001 | Calvin et al. | |
| 6,457,608 B1 | 10/2002 | Riney | |
| 6,527,143 B1 | 3/2003 | Schomacker | |
| 6,611,203 B2 | 8/2003 | Whitmore et al. | |
| 6,612,619 B2 | 9/2003 | Wieder | |
| 6,669,111 B2 | 12/2003 | Vinson et al. | |
| D502,758 S | 3/2005 | Gomez et al. | |
| 6,883,684 B2 | 4/2005 | Jeter et al. | |
| 7,032,789 B2 | 4/2006 | Gabryszewski | |
| 7,216,777 B2 | 5/2007 | Raterman et al. | |
| 7,316,331 B2 | 1/2008 | Gabryszewski | |
| 7,458,524 B2 | 12/2008 | Prieto et al. | |
| 9,409,199 B2 | 8/2016 | Nakano | |
| 2003/0141376 A1 | 7/2003 | Horan et al. | |
| 2003/0173018 A1 | 9/2003 | Harris | |
| 2003/0178503 A1 | 9/2003 | Horan et al. | |
| 2004/0158217 A1 | 8/2004 | Wu et al. | |
| 2005/0127212 A1* | 6/2005 | Kassanits | B05B 15/065 239/597 |

FOREIGN PATENT DOCUMENTS

| | | |
|---|---|---|
| EP | 0 482 381 | 4/1992 |
| GB | 2 000 051 | 1/1979 |
| GB | 2 085 120 | 4/1982 |
| JP | H11 253851 | 9/1999 |
| WO | WO2011083644 A1 | 7/2011 |

OTHER PUBLICATIONS

Written Opinion dated Jan. 15, 2014 International Application No. PCT/US2013/036137.

* cited by examiner

COLOR CODED NOZZLE ADAPTER AND LOCATOR TOOL

CROSS REFERENCE TO RELATED APPLICATIONS

The present application is a national phase entry under 35 U.S.C. § 371 of, and claims priority to, pending International Application No. PCT/US2013/036137 filed on Apr. 11, 2013, for COLOR CODED NOZZLE ADAPTER AND LOCATOR TOOL, which claims the benefit of U.S. Provisional Patent Application Ser. No. 61/624,428 filed on Apr. 16, 2012, the entire disclosures of which are fully incorporated herein by reference.

TECHNICAL FIELD OF THE DISCLOSURE

The invention relates generally to material application apparatus such as used for spraying paints, lacquers, conformal coating and other materials. More particularly, the invention relates to a spray nozzle assembly and a locator tool used with such apparatus.

BACKGROUND OF THE DISCLOSURE

Material application systems are regularly used for applying liquid coating material to an object, part or other work piece or surface. Material application systems typically include a material application device, also referred to as a spray gun or dispenser. A spray nozzle assembly may be mounted at a spray end of the spray gun and includes a nozzle tip having an orifice through which the liquid coating material is discharged, usually under pressure. Due to the wide variety of materials that can be applied, there is also a wide variety of spray nozzle assembly designs. A spray nozzle assembly is used generally to atomize and/or electrostatically charge the liquid coating material and to produce a desired spray pattern. The spray nozzle assembly typically includes the nozzle tip and a nozzle tip holder or adapter. The spray nozzle assembly may include other parts such as seals, for example. The spray nozzle assembly is often mounted on the spray end of the spray gun or dispenser using a retaining nut or other suitable arrangement.

Some work pieces, for example, single open ended cans, need a controlled or directional spray pattern to optimize application of material to the surfaces of interest. A controlled spray pattern is any spray pattern that is produced with a non-uniform distribution of material about the central longitudinal axis of the nozzle tip. Controlled spray patterns are needed in many applications in which it is desired to direct material in a particular manner at the surface being coated. One example of a controlled spray pattern is a directional spray pattern which is simply a spray pattern in which the material exits the nozzle tip in an asymmetrical pattern relative to the central axis of the nozzle tip. An asymmetrical pattern is a spray pattern that has a shape that is heavier on one side or skewed to one side with respect to the central axis of the nozzle tip. A controlled spray pattern may also be used in which the nozzle tip is offset at an angle from the central longitudinal flow axis through the spray gun and particularly nozzle adapter. Controlled and directional spray patterns and the nozzle designs to produce them are well known in the art. Further information as to asymmetric spray patterns and nozzles therefor can be found in U.S. Pat. No. 7,458,524 issued to Prieto, et al. for SPRAY NOZZLE WITH ALIGNMENT KEY, the entire disclosure of which is fully incorporated herein by reference.

SUMMARY OF THE DISCLOSURE

The inventions contemplate in one aspect an arrangement by which an operator can easily and visually verify or identify the directional spray angle of a nozzle, and more specifically the offset angle of the nozzle tip relative to the central longitudinal flow axis of the nozzle adapter. In one embodiment, a nozzle tip holder or adapter is provided that includes one or more features that allows an operator to quickly identify the spray angle of the nozzle adapter. In an exemplary embodiment the nozzle tip holder includes a visual indicia that indicates the offset angle. In an exemplary embodiment, a color marking may be used wherein a distinct color corresponds to or indicates a uniquely related offset angle. This aspect of the inventions may optionally be used with an integral nozzle that produces an offset angled spray direction but does not have a separately inserted nozzle tip.

In accordance with another aspect of the inventions, a locator tool is contemplated that may be used to adjust or determine or measure the spatial position of the spray nozzle tip or alternatively the spray orifice, relative to the position of the workpieces that will be sprayed. In one embodiment, the locator tool may be used to locate the spray orifice a first distance or position from either a wall or end of a container or other workpiece. In another embodiment, the locator tool may be used to locate or position the spray orifice a first distance from a wall of a container and a second distance from an end of the container. In still another embodiment, the locator tool may be used to determine angular alignment of a nozzle tip holder.

A locator tool in accordance with one or more of the inventions herein may include an adjustable holder that can be fixed in position relative to a spray nozzle tip for an alignment or positioning operation, and may be repositioned away from the spray nozzle tip during a spraying operation. In one embodiment, the adjustable holder comprises a measurement member so that an operator may determine the aforementioned first distance and second distance.

These and other aspects and advantages of the present invention will be appreciated and understood by those skilled in the art from the following detailed description of the exemplary embodiments in view of the accompanying drawings.

BRIEF DESCRIPTION OF THE DRAWINGS

FIG. 4A is an enlarged view of the circled portion 4A of FIG. 4;

DETAILED DESCRIPTION OF EXEMPLARY EMBODIMENTS

Figure 1:
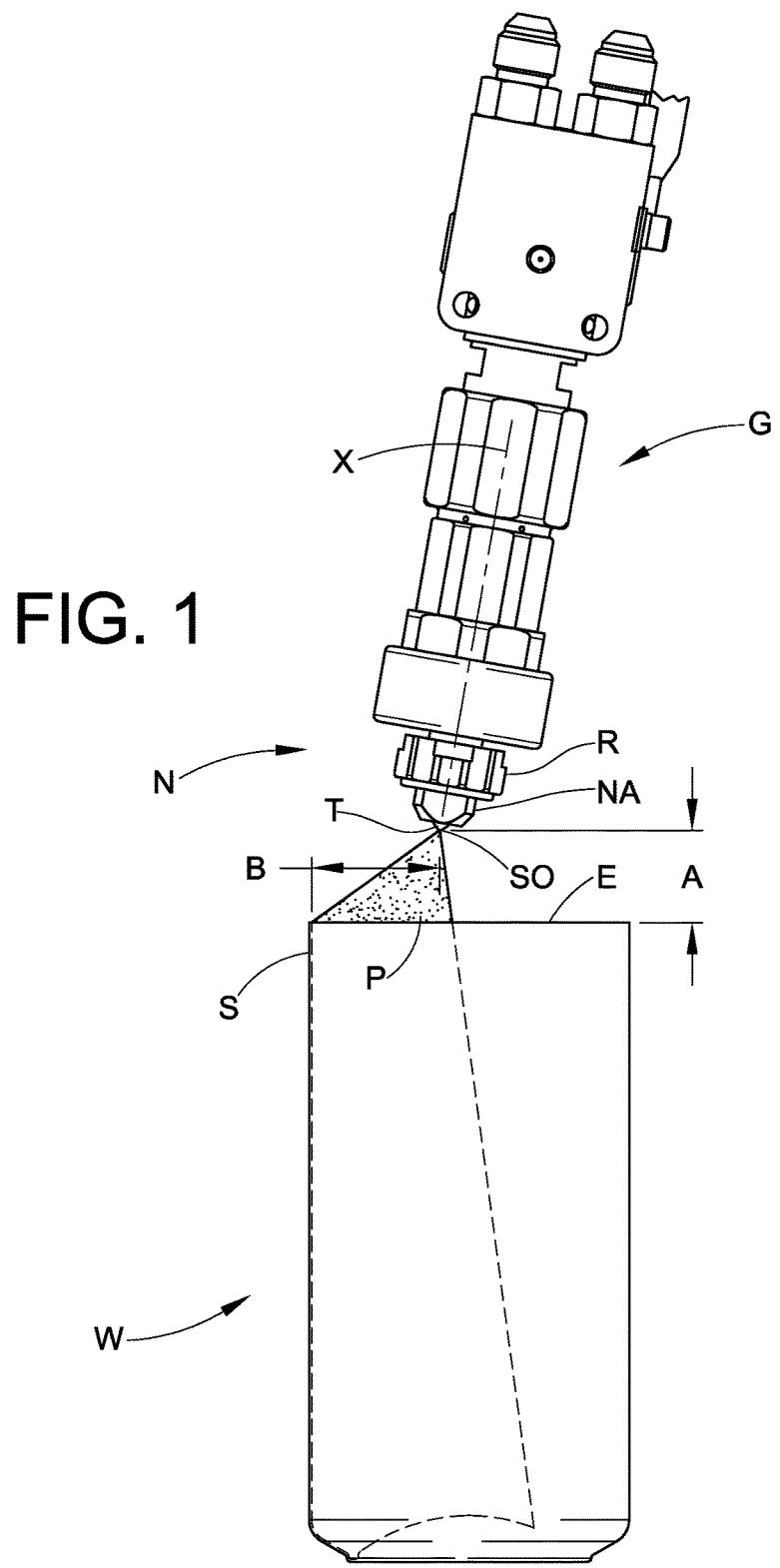
FIG. 1 illustrates a spray gun positioned relative to a workpiece such as an open ended container, showing two location measurement distances.

With reference to FIG. 1, a spray gun G is illustrated in position relative to a workpiece W, such as for example, a single open ended container. In the specific example of FIG. 1, the container W may be a single open ended can, like a beverage, aerosol or food can to name a few examples. The inventions are not limited to any particular spray gun or dispenser nor to any particular workpiece or coating material, although the inventions may conveniently be used with such cans as noted. Not shown in FIG. 1 is a mechanism for holding the spray gun G in position, such as a spray machine, robotic arm and so on. Also not shown is a mechanism for holding the workpiece in position for a spraying operation. Typically, cans are held in a vacuum chuck which also can rotate the can at high speeds for a spraying operation. The spray gun and workpiece mechanisms are not illustrated as they form no part of the present disclosure, and many different types and designs may be used as needed depending on the spray parameters being used for any particular application.

A typical spray gun G may include a spray nozzle assembly N. A spray nozzle assembly N commonly includes a nozzle tip T that has a spray orifice SO formed therein, with the nozzle tip T being securely held in a nozzle tip adapter NA. The nozzle tip adapter NA in turn may be secured to a spray end of the spray gun G by a suitable retainer R such as a threaded nut, for example. For a nozzle tip that produces a fan-like spray pattern, the spray orifice SO may have the form of a slit (see FIG. 11 for example).

As illustrated in FIG. 1, in order to have the spray gun G in proper position for a spraying operation relative to the workpiece W, there may be various distances and dimensions that are specified during setup and calibration of the spray equipment. Two such distances are noted as A and B. Distance A may be defined as the distance from the nozzle tip T to the top or open end E of the workpiece W. Distance B may be defined as the distance from the nozzle tip T to the sidewall S or wall of the workpiece W. FIG. 1 also illustrates an example of a spray pattern P. In this example, the spray pattern P may be an asymmetrical pattern that has an uneven weight distribution within the spray pattern. In the example of FIG. 1, the spray pattern direction is collinear with the central longitudinal axis X of the flow path of material through the spray nozzle assembly N. But as will be explained further below, the spray nozzle assembly N may include an offset angle by which the material is sprayed along a different axis than the axis X. Stated another way, in FIG. 1 the illustrated offset angle is zero degrees.

The distances A and B may be expressed in terms of the nozzle tip T, or alternatively in some cases more specifically the center point of the spray orifice SO that is formed in the nozzle tip T, or even other loci of the spray gun other than just the spray orifice SO or nozzle tip T. The distances A and B as well as other distances may be further defined in terms of other portions of the workpiece W, particularly for workpieces that might be other than single open ended cans.

Figure 2:
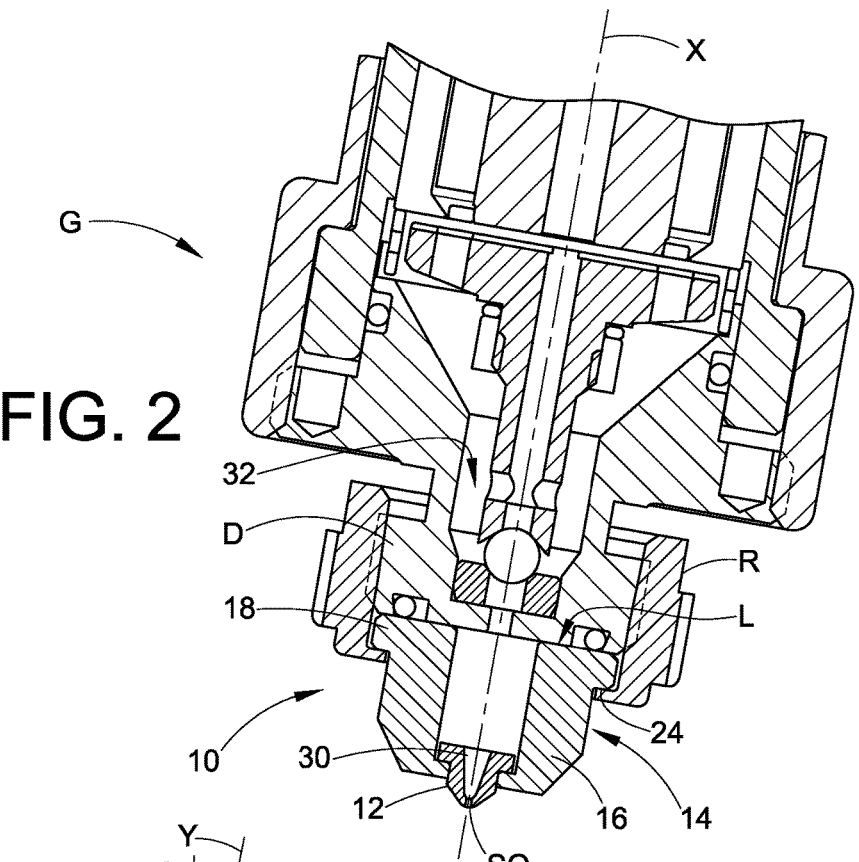
FIG. 2 is an enlarged scale illustration of an exemplary spray end of a spray gun with an attached spray nozzle assembly, in longitudinal cross-section.

With reference to FIG. 2, an exemplary embodiment of a spray nozzle assembly 10 is presented, however, this is but one of many different embodiments that may be used. The present inventions are not dependent on the particular spray nozzle assembly used, and the selected spray nozzle assembly design will vary depending on many different factors as is well known in the art. As noted above, the spray nozzle assembly 10 may be used with any spray gun, applicator or dispenser or similar device G to which the spray nozzle assembly 10 can be attached or mounted or assembled (in the illustrated embodiments, the device G comprises a liquid spray gun). The spray gun G typically will include the threaded retainer R or similarly functioning device that can hold the spray nozzle assembly 10 on a threaded spray end D of the spray gun G in such a manner that the spray nozzle assembly 10 can be rotated about the central longitudinal flow axis X of the spray nozzle assembly 10, for example, before the retainer R is fully tightened onto the spray gun G. The retainer R may be loosened for adjustment of the orientation of the spray pattern then re-tightened as required for a particular spray coating operation. Examples of devices that can use the present invention are described in the following United States patents which are fully incorporated herein by reference, however, the invention may be used with any spray type device, applicator, or dispensing type device G: U.S. Pat. Nos. 3,697,313; 3,737,108; 3,819,403; 5,078,325; 5,494,226; 5,941,463; and 6,742,730. The device G may be electrostatic or non-electrostatic, and used for liquid, powder or other coating materials that are applied to a workpiece. As used herein, the terms nozzle tip holder and nozzle tip adapter are used interchangeably to refer to a device that holds a nozzle tip and is used to mount the nozzle tip onto a spray gun or dispenser or other suitable device. The inventions may be used with a nozzle adapter that has the nozzle tip formed integrally therewith.

While various aspects of the invention are described and illustrated herein as embodied in combination in the exemplary embodiments, these various aspects may be realized in many alternative embodiments, either individually or in various combinations and sub-combinations thereof. Unless expressly excluded herein all such combinations and sub-combinations are intended to be within the scope of the present invention. Still further, while various alternative embodiments as to the various aspects and features of the invention, such as alternative materials, structures, configurations, methods, devices, software, hardware, control logic and so on may be described herein, such descriptions are not intended to be a complete or exhaustive list of available alternative embodiments, whether presently known or later developed. Those skilled in the art may readily adopt one or more of the aspects, concepts or features of the invention into additional embodiments within the scope of the present invention even if such embodiments are not expressly disclosed herein. Additionally, even though some features, concepts or aspects of the invention may be described herein as being a preferred arrangement or method, such description is not intended to suggest that such feature is required or necessary unless expressly so stated. Still further, exemplary or representative values and ranges may be included to assist in understanding the present invention however, such values and ranges are not to be construed in a limiting sense and are intended to be critical values or ranges only if so expressly stated. Additionally, even though some features and aspects and combinations thereof may be described or illustrated herein as having a specific form, fit, function, arrangement or method, such description is not intended to suggest that such descriptions or illustrated arrangements are required or necessary unless so expressly stated. Those skilled in the art will readily appreciate additional and alternative form, function, arrangement or methods that are either known or later developed as substitute or alternatives for the embodiments described herein.

With continued reference then to FIG. 2 the spray nozzle assembly 10 includes a nozzle tip 12 and a nozzle tip holder or adapter 14. The nozzle tip 12 may be retained in the nozzle tip holder 14 by any suitable technique including brazing, press fit and so on, some of which are fully described in the above referenced patents. The particular manner by which the nozzle tip 12 is secured to the nozzle tip holder 14 forms no particular part of the present invention, but it is contemplated that the relative positional relationship or orientation between the nozzle tip 12 and the nozzle tip holder 14 is fixed prior to or after final installation into a device G. In other words, the nozzle tip 12 is installed into the nozzle tip holder 14 with a known orientation corresponding to a desired orientation of the spray pattern produced by the nozzle tip 12.

The nozzle tip holder 14 may include a body 16 that typically but not necessarily has a conical or truncated conical configuration. The back or inside end L of the nozzle tip holder 14 may include a lip, flange or other suitable structure 18 that can be used to secure the nozzle tip holder 14 to the device G such as with the retainer R, while optionally allowing for rotation of the nozzle tip holder 14 about the central flow axis X when the retainer R is loosely installed. The nut retainer R may be designed so that it can be slightly loosened to permit this adjustment or rotation of the spray nozzle assembly 10, and then re-tightened to firmly hold the spray nozzle assembly 10 in position during a spraying or other dispensing operation. The inside end L may form a flat surface that lies in a plane that faces and preferably is seated flat against a facing surface of the threaded end D of the spray gun. These surfaces may alternatively be other than flat although the back end L of the nozzle tip holder 14 may define a plane of angular alignment of the nozzle tip holder 14 relative to the axis X.

Figure 3:
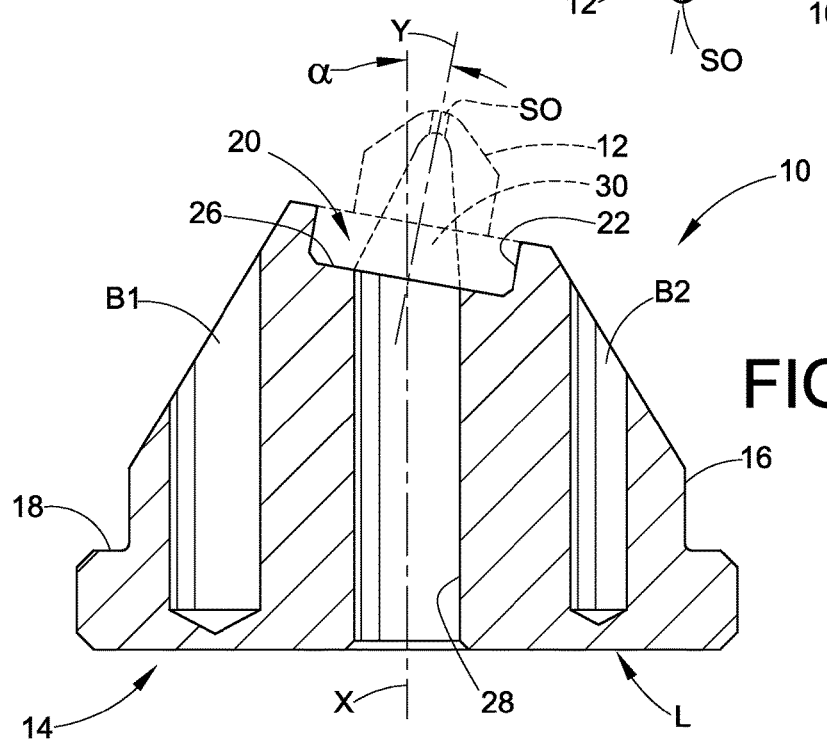
FIG. 3 is an enlarged scale illustration of an exemplary nozzle tip adapter that includes an offset angle α, in longitudinal cross-section.

FIG. 3 illustrates another feature of the spray nozzle assembly 10 that is part of one of the present inventions. As generally shown in FIGS. 1 and 2, the spray nozzle assembly 10, and for example the nozzle tip holder 14, may be arranged so as to produce a spray pattern that is generally directed along an axis Y, wherein the axis Y is offset from the central longitudinal flow axis X of the nozzle tip adapter 14 by an offset angle α. In FIG. 1, the offset angle α is zero degrees, meaning that the axis Y is parallel to the axis X. In many spray gun designs, the longitudinal flow axis X of the nozzle adapter 14 may be collinear with the central longitudinal axis of the spray gun G itself, although such is not required.

In the embodiment of FIG. 3 by comparison, the offset angle α may be, for example, eight degrees. However, the offset angle α may be chosen at any value needed for a particular spraying or coating operation and will in part depend on the setup capabilities of the spray gun support mechanism. Therefore, the offset angle may be commonly in the range of $90°>α≥0°$, although more typically the offset angle may be in the range of $20°≥α≥1°$. Thus, the spray nozzle assembly 10 may be tilted in the sense that it does not spray along a central flow axis X of the spray nozzle adapter 14 which may be but need not be coaxial with a central longitudinal axis of the spray gun G. The angle α may be selected so that an optimized orientation of the spray pattern P (FIG. 1) from the spray nozzle assembly 10 is used to apply material to the can W interior or exterior surfaces. The tilted spray nozzle assembly 10 thus allows an optimized spray angle towards the can W while allowing the spray gun G to approach the can W at the best spray angle.

With continued reference to FIG. 3, the spray nozzle assembly 10 includes the nozzle tip 12 (shown in phantom) that is retained in the spray nozzle adapter 14. The spray nozzle adapter body 16 may include a recess 20 such as a counterbore 22 that is formed or tilted at the desired offset angle α along the axis Y relative to the central flow axis X of the spray nozzle adapter 14. The spray nozzle adapter 14 includes the flange 18 that is engaged by a lip 24 (FIG. 2) on the retainer R in order to tighten the spray nozzle assembly 10 onto the spray end D of the spray gun G.

The recess 20 includes a seat portion 26 against which the nozzle tip 12 sits. The recess 20 may be in fluid communication with a flow bore 28 that extends along the axis X and through the nozzle adapter body 16. The nozzle tip 12 also includes a flow passage 30 that is in fluid communication with the nozzle adapter flow bore 28. The nozzle adapter flow bore 28 is in fluid communication with a flow control valve assembly 32 inside the spray gun G (FIG. 2).

The tilted nozzle concept may be used with a spray orifice SO that produces a symmetrical or asymmetrical spray pattern.

Those skilled in the art will readily appreciate that a spray gun and a coating system generally can be set up in many different configurations. This may include changing the offset angle α from time to time for particular recipes and processes. Large operations may use hundreds of spray guns. The small offset angles α are difficult to discern visually between the various selectable nozzle tip adapters 14, with or without the nozzle tips 12 in place.

Figure 4:
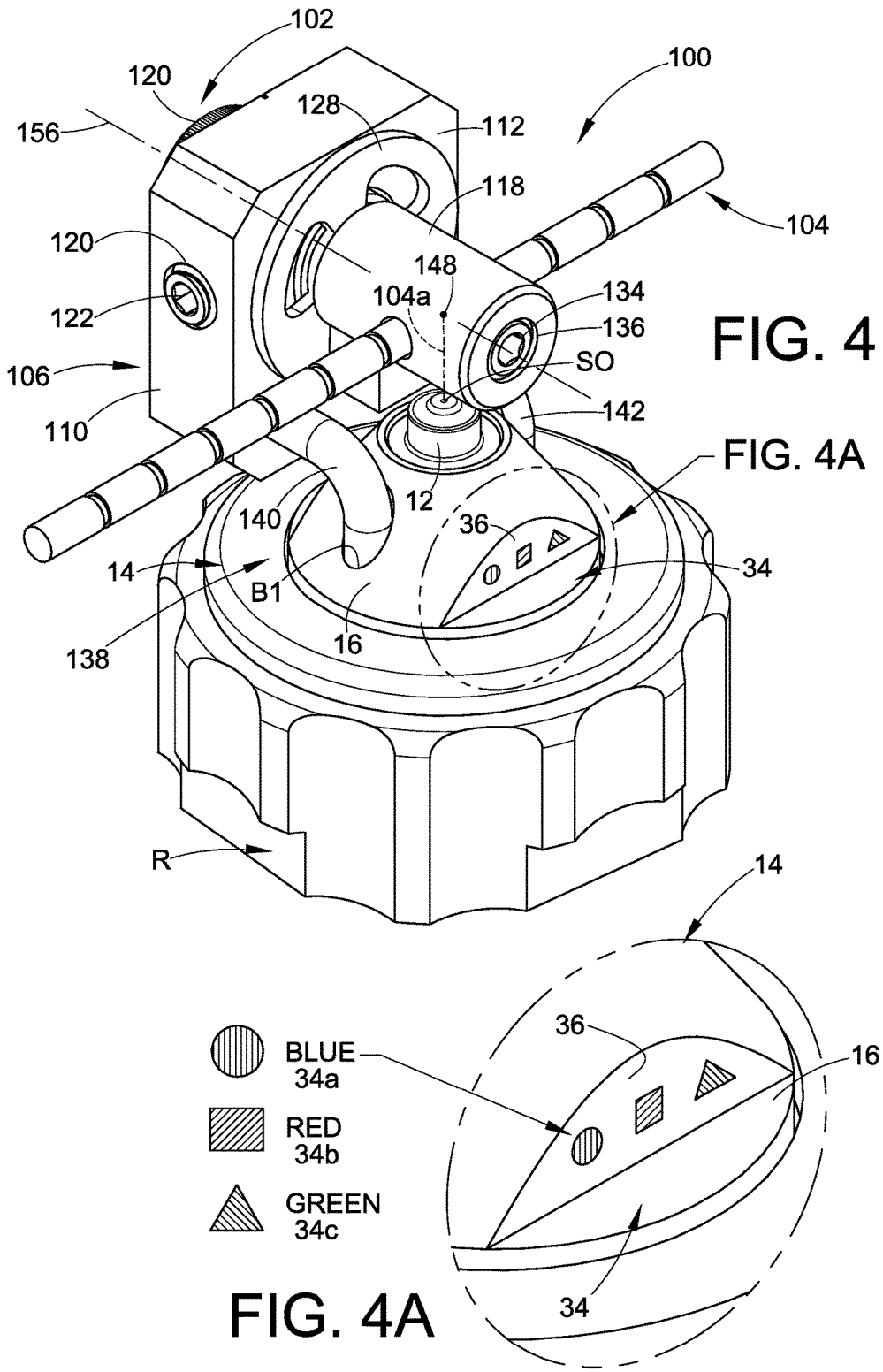
FIG. 4 is an isometric of a locator tool in position on a nozzle tip adapter, and also illustrates a visually perceptible indicia concept.

With reference to FIGS. 4 and 4A, and in accordance with an aspect of one or more of the inventions disclosed herein, an angled nozzle tip adapter 14 that retains a nozzle tip at an offset angle α is provided with visually perceptible indicia 34 that indicates to the operator or other individual the offset angle α value for that particular nozzle tip adapter body 16. In this particular embodiment, the visual indicia 34 may be placed on a flat surface 36, such as may be provided as a wrench or tool flat. The flats 36 may be used, for example, to use a wrench like tool to hold the nozzle tip adapter body 16 in position while the retainer R is tightened onto the spray gun G. The flats 36 may be arranged, for example, so as to be parallel with the spray orifice slit (FIG. 11) when the nozzle tip 12 is properly seated in the nozzle tip adapter 14. But, for purposes of the present disclosure, the surface 36 need not be flat, but can be any conveniently available surface on the nozzle tip adapter body 16. In a preferred but not required embodiment, a visual indicia 34 comprises a color marking as represented by markings 34a, 34b and 34c. In practice, it may be that only a single visual indicia is used, but we show several to represent that the appearance of the visual indicia may be selected as needed. For example, a blue marking or visual indicia 34a may be used to indicate a six degree offset angle; a red marking or visual indicia 34b may be used to indicate an eight degree offset angle; a green marking or visual indicia 34c may be used to indicate a ten degree offset angle; and so forth as needed for all selectable nozzle tip adapters 14 at a particular work station or facility.

Moreover, besides color, the visual indicia 34 may also take on a unique color form or shape should the color fade, for example. The only preferred aspect is that the visual indicia 34 be visually unique for each offset angle α associated with a particular nozzle tip adapter body 16. Since typically there will be several nozzle tip adapters 14 for use with a spray gun G, it is preferred to have a unique color associated with each offset angle α. Many different colors and forms may be used, such as but not limited to: one or more lines, one or more dots, a flange surface, any geometric shape, any colored or partially colored surface on the nozzle tip adapter body 16, a mark, and so on. In the examples of FIGS. 4 and 4A, a blue circle may be used, a red square may be used or a green triangle may be used.

Figure 5:
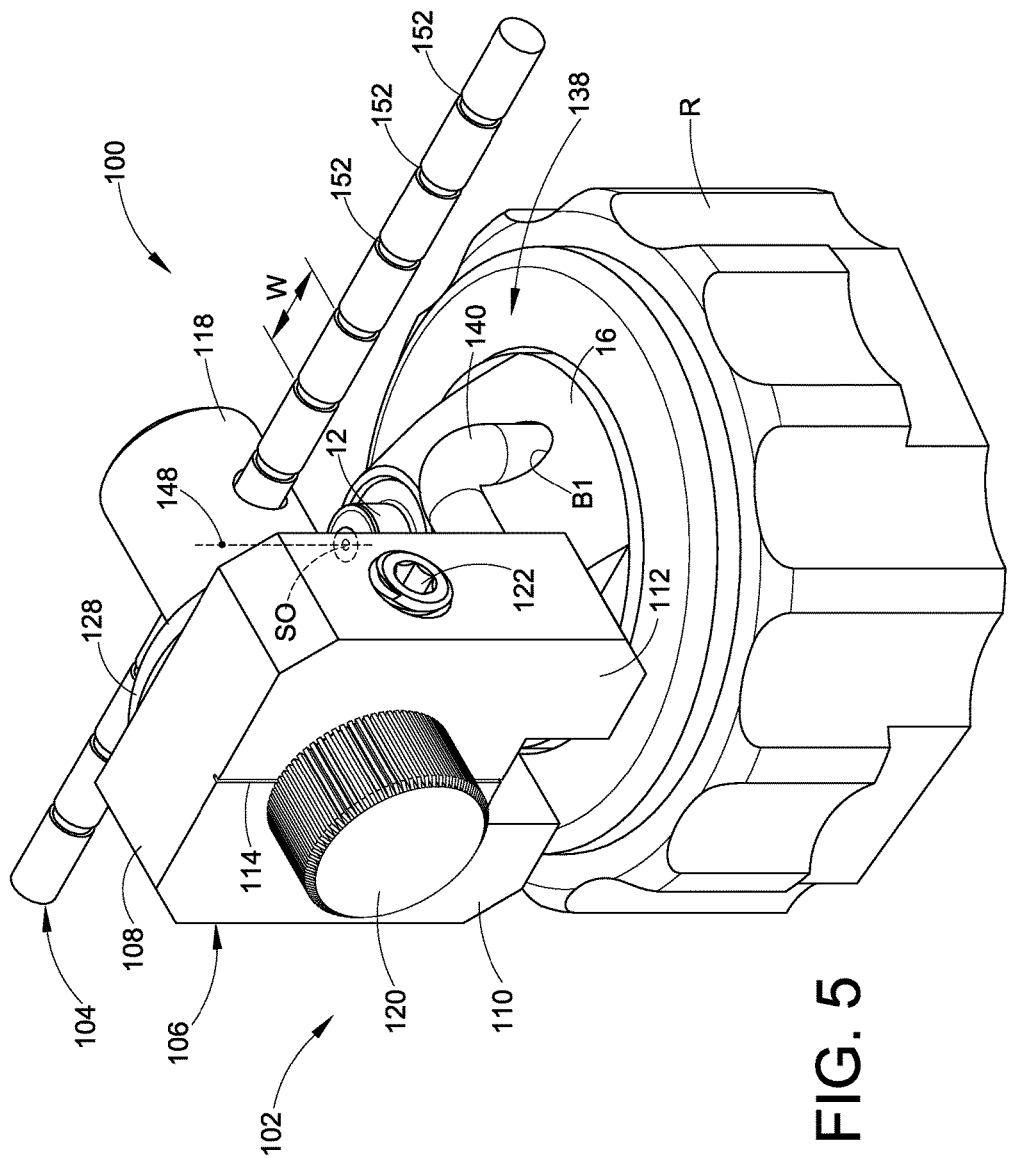
FIG. 5 is a reverse side isometric of the locator tool in FIG. 4.
Figure 6:
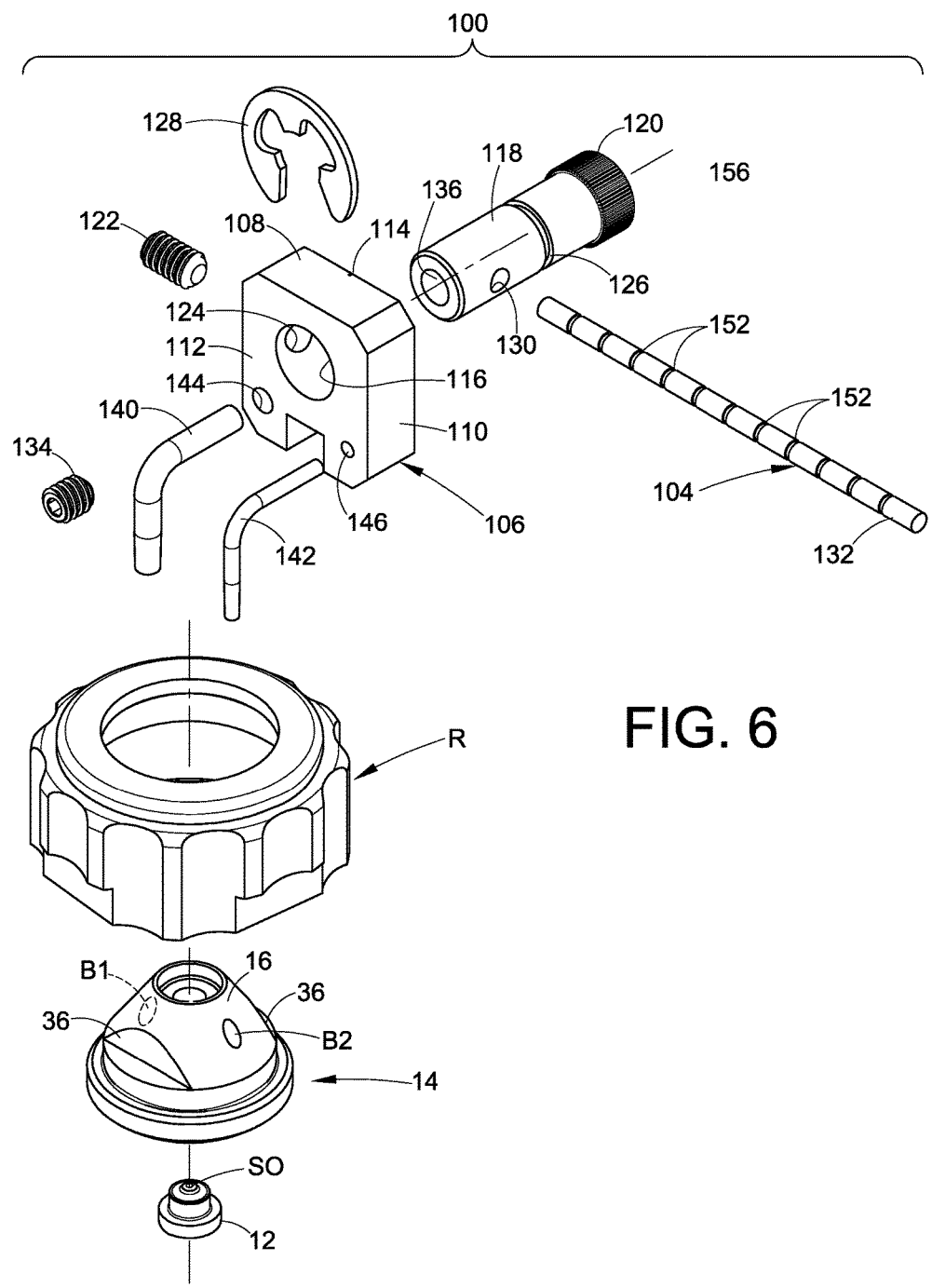
FIG. 6 is an exploded perspective of the assembly of FIG. 4 without showing the visually perceptible indicia concept.

With reference to FIGS. 4-6, we next describe another inventive feature. As noted hereinabove, the distances A and B or other dimensions, distances or lengths may be used to align and position or locate the nozzle tip 12 with the spray orifice SO. A locator tool 100 may be used for these purposes. In one embodiment, the locator tool 100 may include an adjustable holder 102 that supports a measurement member or position adjustment member 104 in selectable positions for making desired measurements, such as for example, distances A and B of FIG. 1. Those skilled in the art will readily appreciate that FIGS. 4-6 illustrate just one of many possible ways to embody a locator tool and measurement function and the specific structural features should not be construed in a limiting sense as to the scope of the inventions.

The adjustable holder 102 may be realized in any form that facilitates positioning the measurement member 104 so as to make a measurement or a position adjustment. It should be noted that when we use the term "measurement" or derivatives thereof herein, such terminology does not imply or require that an actual distance in units of length be determined or used, although such may be done if so desired. We use the term measurement in its broader sense to indicate that the measurement member or position adjustment member 104 may be used to position the nozzle tip 12 or the spray orifice SO accurately with respect to a location feature or locus of the work pieces that will be sprayed or coated. Therefore, demarcations on the measurement member 104 may be but need not be in units of length or distance, but rather can simply be relative location, distance or other positioning marks.

The adjustable holder 102 may include a clamp like mechanism 106 which may have a clamping body 108. The clamping body 108 includes first and second sides 110, 112 that are provided by a slit 114 through a portion of the clamping body 108. This slit 114 allows for a slight spreading of the first and second sides 110, 112. As further explained below, the slit 114 may also be used to verify or alternatively to adjust the angular orientation of a rotatable member 118 about the axis 156 relative to a reference position. The clamping body 108 further includes an aperture 116 therethrough that closely receives the rotatable member 118 which has a knob 120 at one end thereof. A first set screw 122 extends into a threaded bore 124 so that when the first set screw 122 is tightened the rotatable member 118 is fixed in position. The rotatable member 118 may include a retaining groove 126 that receives a snap ring 128 or other suitable retainer to hold the rotatable member 118 in the aperture 116 but allowing the knob 120 to be used to turn the rotatable member 118 when the first set screw 122 is loosened.

The rotatable member 118 includes a smooth bore 130 that closely receives the measurement member 104, which in the illustrated embodiment may be a rod like body 132. A second set screw 134 extends into a threaded bore 136 so that when the second set screw is tightened the measurement member 104 is fixed in position.

The clamping body 108 further may include a mounting arrangement or mechanism 138 for installing the locator tool 100 in a fixed position on the nozzle tip adapter body 16 for an alignment or setup operation. Preferably, when the locator tool 100 is fixed in position on the nozzle tip adapter body 16, the measurement member 104 has a known spatial relationship with the nozzle tip 12 and the spray orifice SO. The mounting mechanism 138 also preferably allows the locator tool 100 to be removed from the nozzle tip adapter body so that the locator tool is repositioned away from the spray nozzle tip 12 during a spraying or coating operation.

The mounting mechanism 138 may have many different forms, and in this example includes a first leg 140 and a second leg 142 that are received in respective bores 144, 146 in the clamping body 108. The first and second legs 140, 142 may be but need not be the same in size, length and shape. With reference to the above incorporated U.S. Pat. No. 7,458,524 the nozzle tip adapter body 16 may be provided with two bores B1 and B2 of different diameters so as to accommodate a tool (not shown) that can be used by an operator to determine the heavy side of a spray pattern from the spray orifice SO when an asymmetrical spray pattern is used. The embodiment of FIGS. 4-6 may optionally include this concept, therefore, the first and second legs 140, 142 may be of different diameters so as to fit respectively in the nozzle tip adapter body bores B1 and B2. It is preferable that the first and second legs 140, 142 fit snugly into the bores B1 and B2 or are otherwise securely held so that the locator tool 100 is fixed in position when in use.

When the locator tool is installed on the nozzle tip adapter body 16 (FIG. 4), the measurement member 104 preferably is located directly above the center of the spray orifice SO (as indicated with the dashed line 104a in FIG. 4) which thus can be thought of as a reference point or location 148 for the measurement member. But optionally, the designer may select for the measurement member 104 to be positioned relative to a different reference point or location 148 on the spray nozzle assembly 10 or even the spray gun G if so needed. Regardless of the selected reference location 148 used for the measurement member 104, by positioning the measurement member 104 at a known spatial relationship with respect to the reference location 148, the measurement member 104 can be used to align and position the reference location 148 relative to the desired locations on the work piece W. It should also be noted that the reference point 148 may be different depending on the measurement being made, even for the same work piece and spray orifice SO or spray nozzle tip 12.

Figure 7:
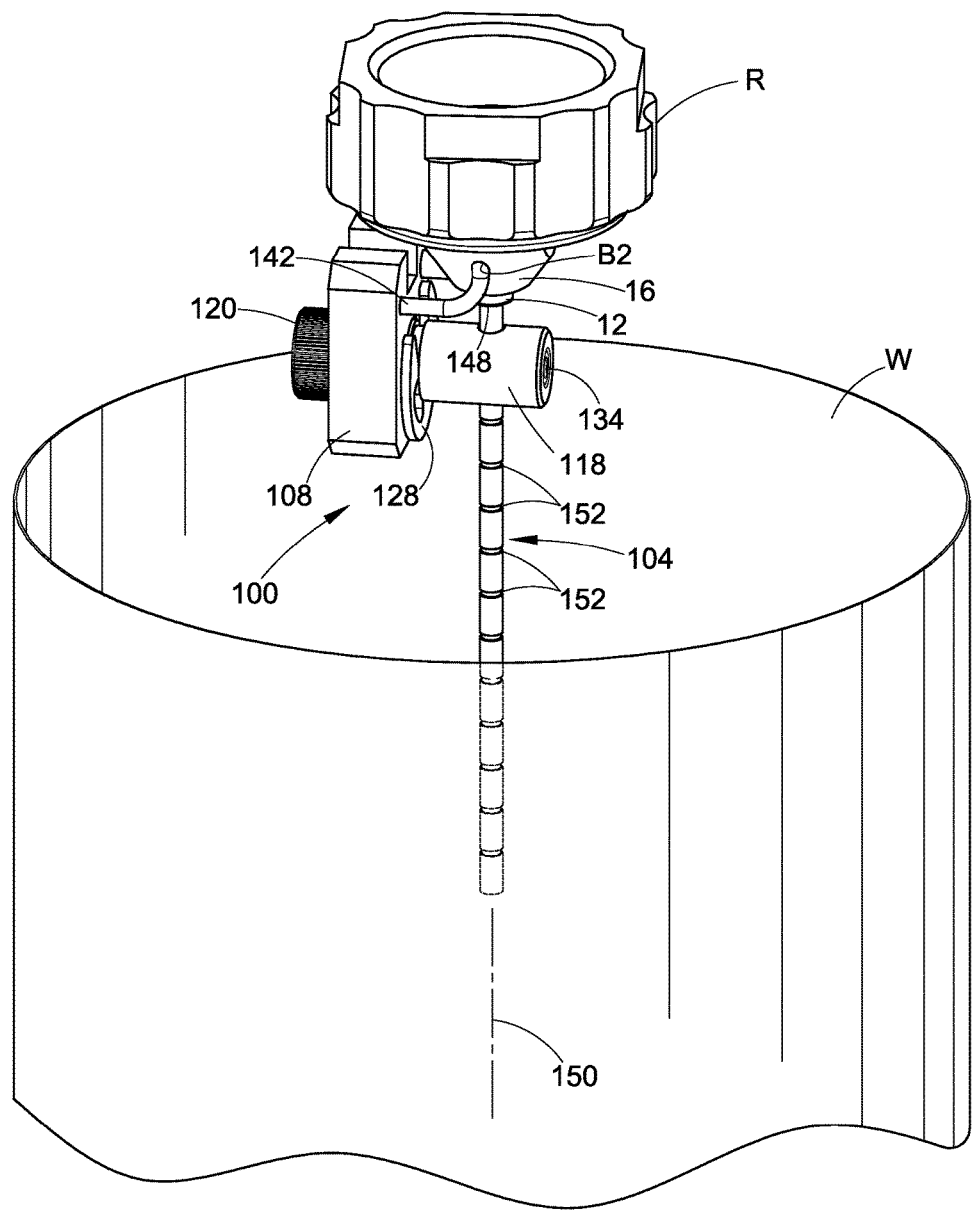
FIG. 7 illustrates a measurement technique for a distance or position A in FIG. 1.
Figure 8:
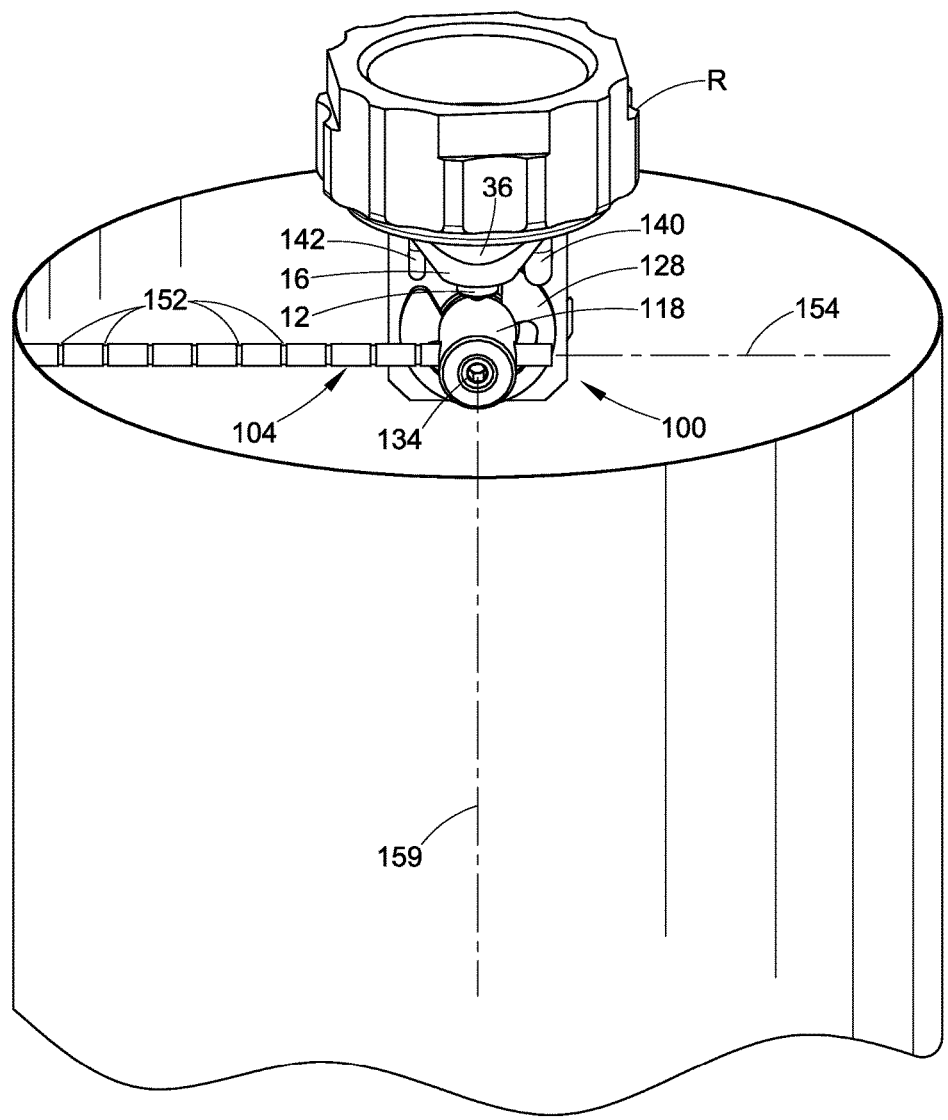
FIG. 8 illustrates a measurement technique for a distance or position B in FIG. 1.

FIGS. 7 and 8 illustrate examples of how the locator tool 100 may be used. In FIG. 7, initially the first set screw 122 can be loosened so that the adjustment knob 120 can be used to orient the measurement member 104 coaxial with a centerline 150 of the work piece. The first set screw is tightened so as to fix this orientation of the measurement member 104. The second set screw 134 can be loosened which allows the measurement member 104 to be positioned relative to the reference position 148. For this example, the measurement member 104 can be positioned so that one end abuts the spray nozzle tip 12 at the spray orifice SO, thus making the spray orifice SO the reference location 148 directly.

The measurement member 104 may be provided with a series of demarcations 152, such as scribe lines or other visual indications of position or distance. For example, the demarcations 152 may be separated from each other by a distance W, wherein W (FIG. 5) may be an actual known length in inches for example, or the demarcations (for example, position markings) may be accurately positioned with respect to each other using criteria other than specific lengths. An operator can then position the spray gun so that the end E of the can work piece is at a desired distance or position relative to the reference location 148a such as the spray orifice SO. This corresponds to distance A in FIG. 1 as an example.

The measurement member 104 can be removed if so needed so that the first set screw 122 when loosened will allow the knob 120 to be used to turn the rotatable member 118 ninety degrees to the position shown in FIG. 8. The measurement member 104 can be inserted into the smooth bore 130 and the second set screw 134 is tightened to fix the position of the measurement member 104 as needed to make the measurement B (FIG. 1). In this example, the reference position 148 may be as in FIG. 4 with the dotted line 104a coaxial with the centerline 150 of the work piece W. Preferably, the measurement member 104 will now be coaxial with a radial line 154 that is normal to the centerline 150 of the work piece W and the nozzle tip adapter body 16.

From FIG. 4 it will also be appreciated that the knob 120 may also be used to verify or to adjust the angular position or alignment of the measurement member 104 about an axis of rotation 156 of the rotatable member 118 to verify that the nozzle tip adapter 14 and/or the nozzle tip 12 is properly mounted and aligned to the spray gun G or other desired reference position. For example, when the measurement member 104 is fixed in a known position relative to the adjustable holder 102, then when the adjustable holder 102 is installed on the nozzle tip adapter body 16, an operator can determine whether the nozzle tip adapter body 16 and the nozzle tip 12 are positioned correctly on the spray gun.

As an example, when the retainer R is tightened onto the threaded end D of the spray gun G, it is sometimes possible that the nozzle tip holder 14 becomes cocked or otherwise not properly or fully seated. This may be visually challenging to detect just by visual observation of the nozzle tip or the nozzle tip holder. But with the measurement member 104 installed, the measurement member 104 may provide a more distinct indication of this angular misalignment of the nozzle tip holder 14, because the measurement angle may have a noticeable cant or slope that it would not otherwise have if the nozzle tip holder 14 was properly seated. In such an example, the operator may simply loosen the retainer R and reseat the nozzle tip holder 14 before retightening the retainer R.

Figure 9:
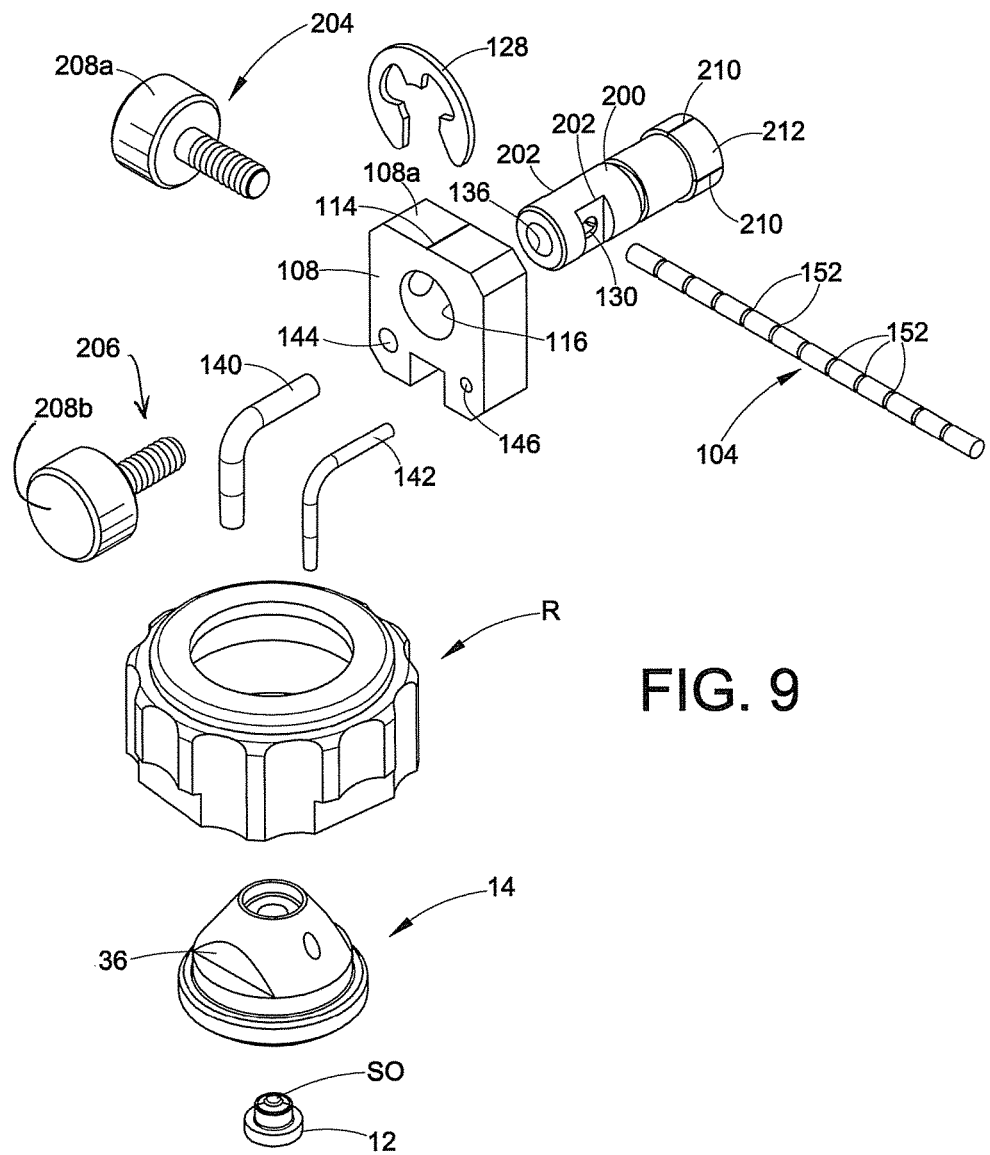
FIGS. 9-11 illustrate an alternative embodiment of the rotatable member in the assembly of FIGS. 4-6 with FIG. 9 an exploded isometric and FIGS. 10 and 11 reverse isometrics about the vertical axis.
Figure 10:
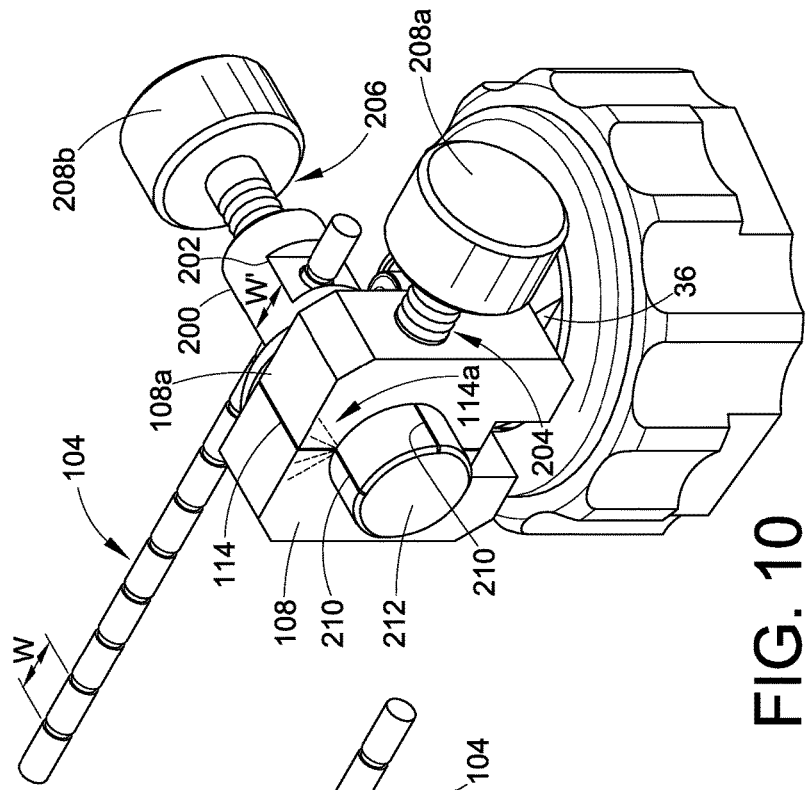
Figure 11:
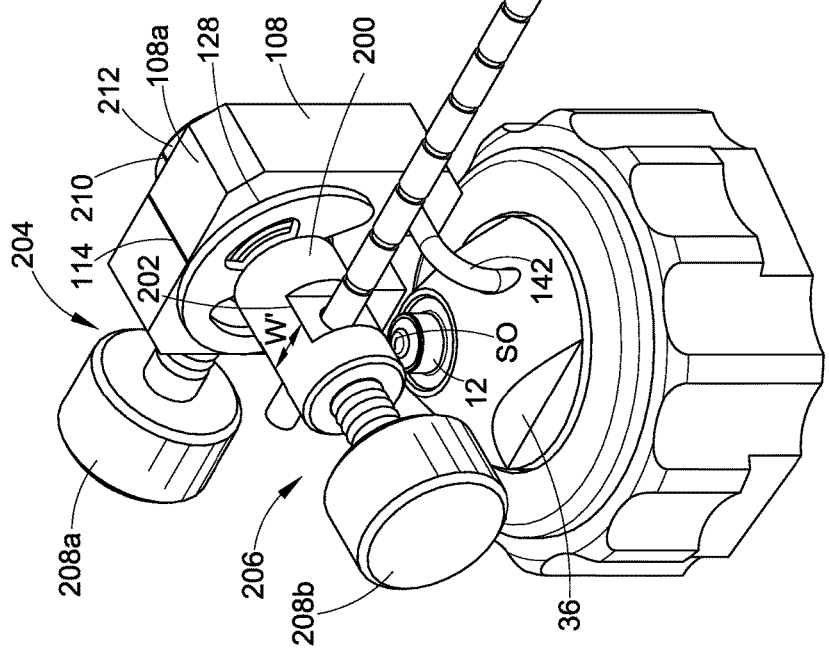

With reference to FIGS. 9-11, we illustrate an alternative embodiment of the locator tool 100, and in particular the adjustable holder 102. All parts other than those modified in this embodiment may be but need not be the same as described hereinabove and like parts are given like reference numerals. In this embodiment, we provide a rotatable member 200 that may be provided with opposed flats 202. The smooth bore 130 may receive the measurement member 104 as in the above embodiment. The flats 202 may be formed so that they are separated by a distance W' (FIG. 10) that may correspond with the distance W (FIGS. 5 and 10) between adjacent pairs of the demarcations 152 on the measurement member 104. This optional feature can facilitate more accurate positioning and/or measurement of the distances A and B (FIG. 1) or other dimensions and positions as needed. Although in this embodiment W=W' such is not required. For example, in some applications it may be desired that W and W' are fractionally or proportionately related to each other.

Another optional alternative embodiment we illustrate is a modification to the set screws 122, 134 illustrated in FIG. 6. In the alternative approach, one or both of the set screws 204, 206 are provided with a respective knob 208 (208a and 208b respectively for the set screws 204, 206). The knobs 208 facilitates easier adjustment of the set screws 204, 206. The set screws 204, 206 may otherwise be used in like manner as the set screws 122, 134 in the above embodiment of FIG. 6.

Another optional alternative embodiment we illustrate is to provide the slit 114, or other visual indication as needed, across the top surface 108a of the clamping body 108. The rotatable member 200 may also be provided with a series of demarcations or visual indications 210. These demarcations 210 may be spaced, for example, at angles such as, for example, ninety degree intervals about the knob 212 portion of the rotatable member 200. The knob 212 may also be knurled or otherwise surface treated as needed to facilitate use. As best illustrated in FIG. 10, the knob demarcations 210 may be used in cooperation with the slit 114 to assure that the measurement member 104 is angularly aligned with the nozzle tip T, or if so desired the spray orifice SO. For example, if the offset angle α is zero degrees, then when the locator tool 100 is installed on the nozzle tip holder 14, the measurement member 104 should appear to be parallel with the spray orifice SO or alternatively the alignment plane of the nozzle tip holder 14. If there is an angular misalignment such that the measurement member 104 appears titled relative to the spray orifice SO or the nozzle tip holder 14, then this could indicate that the nozzle tip holder 14 is cocked or otherwise out of proper position. Now for offset angles other than zero degrees, when the measurement member 104 is adjusted to be parallel to the spray orifice slit SO, then the demarcations 210 and the slit 114 should correspond to the offset angle. Again, if there is a difference, then the operator knows to reseat the nozzle tip holder 14. As another example, during initial setup the set screw 204 may be loosened so that the knob 212 can be used to rotate the rotatable member 200 until the demarcation 114 aligns with the appropriate demarcation 210 on the knob 212. The knob demarcations 210 may also be provided in finer increments if so desired. The measurement member 104 should then appear parallel with the spray orifice SO or the plane of the nozzle tip holder 14. Alternatively, additional demarcations 114a (shown in phantom in FIG. 10) may be provided on the clamping body 108 to facilitate angular measurement or adjustment of the measurement member 104 relative to a selected reference position as needed.

The visually perceptible indicia concept 34 described hereinbefore is not illustrated in FIGS. 9-11 but may optionally be used as needed.

The invention has been described with reference to the exemplary embodiments. Modifications and alterations will occur to others upon a reading and understanding of this specification and drawings. It is intended to include all such modifications and alterations insofar as they come within the scope of the appended claims or the equivalents thereof.

We claim:

1. A plurality of nozzle tip holders for a spray gun, the nozzle tip holders comprising:
   a first nozzle tip holder comprising:
      a first body that is adapted to be installed on a spray gun, said first body comprising a first bore that extends along a first axis from a gun end of said first body to a nozzle tip end of first said body,
      said nozzle tip end of said first body defining a first recess configured to receive a nozzle tip, said first recess being in fluid communication with said first bore, and said first recess comprising a first seat surface, said first seat surface being transverse a second axis, said second axis being formed at a first offset angle less than 90° from said first axis, and
said first body comprising a first color that uniquely corresponds to said first offset angle, and
a second nozzle tip holder comprising:
a second body that is adapted to be installed on the spray gun, said second body comprising a second bore that extends along a third axis from a gun end of said second body to a nozzle tip end of second said body,
said nozzle tip end of said second body defining a second recess configured to receive a nozzle tip, said second recess being in fluid communication with said second bore, and said second recess comprising a second seat surface,
said second seat surface being transverse a fourth axis, said fourth axis being formed at a second offset angle less than 90° from said third axis, the second offset angle being different from the first offset angle, and
said second body comprising a second color that uniquely corresponds to said second offset angle, the second color being different from the first color.

2. The plurality of nozzle tip holders of claim 1, wherein:
the first offset angle is between 4° and 20°, and
the second offset angle is between 4° and 20°.

3. The plurality of nozzle tip holders of claim 1, wherein:
the first offset angle is 6°, 8°, 10°, 12°, or 15°, and
the second offset angle is 6°, 8°, 10°, 12°, or 15°.

4. The plurality of nozzle tip holders of claim 1, wherein:
said first color is on a first colored form on said first body,
said second color is on a second colored form on said second body, and
the second colored form being different from the first colored form.

5. The plurality of nozzle tip holders of claim 4, wherein:
said first colored form is a line, dot, arrow, flange, geometric shape, or a surface of said first body, and
said second colored form is a line, dot, arrow, flange, geometric shape, or a surface of said second body.

6. The plurality of nozzle tip holders of claim 4, wherein:
said first colored form comprises a first visually detectable mark that uniquely corresponds to said first offset angle,
said second colored form comprises a second visually detectable mark that uniquely corresponds to said second offset angle, and
said second visually detectable mark being different from said first visually detectable mark.

7. The plurality of nozzle tip holders of claim 1, wherein the first body comprises at least one flat surface configured to engage a tool for tightening the first body to the spray gun.

8. The plurality of nozzle tip holders of claim 7, wherein the first color is provided on the at least one flat surface of the first body.

9. The plurality of nozzle tip holders of claim 8, wherein the at least one flat surface is configured to be parallel with a spray orifice of the nozzle tip when the nozzle tip is seated in the first recess.

10. The plurality of nozzle tip holders of claim 9, wherein the at least one flat surface comprises two flat surfaces on opposite sides of the spray orifice of the nozzle tip.

11. The plurality of nozzle tip holders of claim 1, wherein said first color and said second color are visible to a spray gun operator.

12. A spray nozzle assembly kit, comprising:
a first nozzle tip holder comprising:
a first body that is adapted to be installed on a spray gun, said first body comprising a first bore that extends along a first axis from a gun end of said first body to a nozzle tip end of first said body,
said nozzle tip end of said first body defining a first recess configured to receive a nozzle tip, said first recess being in fluid communication with said first bore, and said first recess comprising a first seat surface,
said first seat surface being transverse a second axis, said second axis being formed at a first offset angle less than 90° from said first axis, and
said first body comprising a first color that uniquely corresponds to said first offset angle;
a second nozzle tip holder comprising:
a second body that is adapted to be installed on the spray gun, said second body comprising a second bore that extends along a third axis from a gun end of said second body to a nozzle tip end of second said body,
said nozzle tip end of said second body defining a second recess configured to receive a nozzle tip, said second recess being in fluid communication with said second bore, and said second recess comprising a second seat surface,
said second seat surface being transverse a fourth axis, said fourth axis being formed at a second offset angle less than 90° from said third axis, the second offset angle being different from the first offset angle, and
said second body comprising a second color that uniquely corresponds to said second offset angle, the second color being different from the first color; and
a nozzle tip configured to be received in said first recess or said second recess, said nozzle tip comprising a flow passage that is in fluid communication with said first bore or said second bore, and said nozzle tip directing fluid flow in a direction along said second axis or said fourth axis when fluid is sprayed through said nozzle tip.

13. A spray gun kit, comprising:
a spray gun;
a first nozzle tip holder comprising:
a first body that is adapted to be installed on a spray gun, said first body comprising a first bore that extends along a first axis from a gun end of said first body to a nozzle tip end of first said body,
said nozzle tip end of said first body defining a first recess configured to receive a nozzle tip, said first recess being in fluid communication with said first bore, and said first recess comprising a first seat surface,
said first seat surface being transverse a second axis, said second axis being formed at a first offset angle less than 90° from said first axis, and
said first body comprising a first color that uniquely corresponds to said first offset angle;
a second nozzle tip holder comprising:
a second body that is adapted to be installed on the spray gun, said second body comprising a second bore that extends along a third axis from a gun end of said second body to a nozzle tip end of second said body,
said nozzle tip end of said second body defining a second recess configured to receive a nozzle tip, said second recess being in fluid communication with said second bore, and said second recess comprising a second seat surface, said second seat surface being transverse a fourth axis, said fourth axis being formed at a second offset angle less than 90° from said third axis, the second offset angle being different from the first offset angle, and said second body comprising a second color that uniquely corresponds to said second offset angle, the second color being different from the first color; and a retainer configured to join said first nozzle tip holder or said first nozzle tip holder to said spray gun.

14. The spray gun kit of claim 13, further comprising a nozzle tip configured to be disposed in said first recess or said second recess, said nozzle tip comprising a flow passage that is in fluid communication with said first bore or said second bore, and said nozzle tip directing fluid flow in a direction along said second axis or said fourth axis when fluid is sprayed through said nozzle tip.

15. The spray gun kit of claim 13, wherein said spray gun comprises a liquid spray gun.

16. A plurality of spray nozzle assemblies, comprising:
a first spray nozzle assembly comprising:
a first body configured to be installed on a spray gun, said first body comprising a first bore that extends along a first axis from a gun end of said first body to a nozzle tip end of said first body, and
a first nozzle tip comprising a flow passage terminating in a spray orifice,
said nozzle tip end of said first body defining a first recess, said first nozzle tip being disposed in said first recess, said first recess being in fluid communication with said first bore, said first recess comprising a first seat surface, said flow passage of said first nozzle tip being in fluid communication with said first bore,
said first seat surface being transverse a second axis, said second axis being formed at a first offset angle less than 90° from said first axis, and
said first body comprising a first color that uniquely corresponds to said first offset angle, and
a second spray nozzle assembly comprising:
a second body configured to be installed on the spray gun, said second body comprising a second bore that extends along a third axis from a gun end of said second body to a nozzle tip end of said second body, and
a second nozzle tip defining comprising a flow passage terminating in a spray orifice,
said nozzle tip end of said second body defining a second recess, said second nozzle tip being disposed in said second recess, said second recess being in fluid communication with said second bore, said second recess comprising a second seat surface, said flow passage of said second nozzle tip being in fluid communication with said second bore,
said second seat surface being transverse a fourth axis, said fourth axis being formed at a second offset angle less than 90° from said third axis, and
said second body comprising a second color that uniquely corresponds to said second offset angle, the second color being different from the first color.

17. The plurality of spray nozzle assemblies of claim 16, wherein:
the first offset angle is between 4° and 20°, and
the second offset angle is between 4° and 20°.

18. The plurality of spray nozzle assemblies of claim 16, wherein:
the first offset angle is 6°, 8°, 10°, 12°, or 15°, and
the second offset angle is 6°, 8°, 10°, 12°, or 15°.

19. The plurality of spray nozzle assemblies of claim 16, wherein:
said first color is on a first colored form on said first body,
said second color is on a second colored form on said second body, and
the second colored form being different from the first colored form.

20. The plurality of spray nozzle assemblies of claim 19, wherein:
said first colored form is a line, dot, arrow, flange, geometric shape, or a surface of said first body, and
said second colored form is a line, dot, arrow, flange, geometric shape, or a surface of said second body.

21. The plurality of spray nozzle assemblies of claim 16, wherein the first body comprises at least one flat surface configured to engage a tool for tightening the first body to the spray gun.

22. The plurality of spray nozzle assemblies of claim 21, wherein the first color is provided on the at least one flat surface of the first body.

23. The plurality of spray nozzle assemblies of claim 22, wherein the at least one flat surface is configured to be parallel with the spray orifice of the first nozzle tip when the first nozzle tip is seated in the first recess.

24. The plurality of spray nozzle assemblies of claim 23, wherein the at least one flat surface comprises two flat surfaces on opposite sides of the spray orifice of the first nozzle tip.

25. The plurality of spray nozzle assemblies of claim 16, wherein second nozzle tip is the same as the first nozzle tip.

26. A spray gun kit, comprising:
a spray gun;
a first spray nozzle assembly comprising:
a first body configured to be installed on a spray gun, said first body comprising a first bore that extends along a first axis from a gun end of said first body to a nozzle tip end of said first body, and
a first nozzle tip comprising a flow passage terminating in a spray orifice,
said nozzle tip end of said first body defining a first recess, said first nozzle tip being disposed in said first recess, said first recess being in fluid communication with said first bore, said first recess comprising a first seat surface, said flow passage of said first nozzle tip being in fluid communication with said first bore,
said first seat surface being transverse a second axis, said second axis being formed at a first offset angle less than 90° from said first axis, and
said first body comprising a first color that uniquely corresponds to said first offset angle;
a second spray nozzle assembly comprising:
a second body configured to be installed on the spray gun, said second body comprising a second bore that extends along a third axis from a gun end of said second body to a nozzle tip end of said second body, and
a second nozzle tip defining comprising a flow passage terminating in a spray orifice,
said nozzle tip end of said second body defining a second recess, said second nozzle tip being disposed in said second recess, said second recess being in fluid communication with said second bore, said second recess comprising a second seat surface, said flow passage of said second nozzle tip being in fluid communication with said second bore, said second seat surface being transverse a fourth axis, said fourth axis being formed at a second offset angle less than 90° from said third axis, and said second body comprising a second color that uniquely corresponds to said second offset angle, the second color being different from the first color; and a retainer configured to join one of the first spray nozzle assembly and the second spray nozzle assembly with said spray gun.

27. The spray gun kit of claim 26, wherein said spray gun comprises a liquid spray gun.

* * * * *